(12) United States Patent
Budge et al.

(10) Patent No.: US 11,840,022 B2
(45) Date of Patent: Dec. 12, 2023

(54) SYSTEM AND METHOD FOR ADDITIVE MANUFACTURING

(71) Applicant: Continuous Composites Inc., Coeur d'Alene, ID (US)

(72) Inventors: Dan Budge, Harrison, ID (US); Mikel Negugogor, Coeur d'Alene, ID (US); Rachael Kathleen Morris, Greenacres, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 223 days.

(21) Appl. No.: 16/949,300

(22) Filed: Oct. 23, 2020

(65) Prior Publication Data

US 2021/0197490 A1 Jul. 1, 2021

Related U.S. Application Data

(60) Provisional application No. 62/955,352, filed on Dec. 30, 2019.

(51) Int. Cl.
*B29C 64/393* (2017.01)
*B29C 64/40* (2017.01)
(Continued)

(52) U.S. Cl.
CPC ............ *B29C 64/393* (2017.08); *B29C 64/40* (2017.08); *B33Y 10/00* (2014.12); *B33Y 40/20* (2020.01);
(Continued)

(58) Field of Classification Search
CPC . B29C 64/393; B29C 64/40; B29C 2793/009; B33Y 10/00; B33Y 50/02; B33Y 40/20
See application file for complete search history.

(56) References Cited

U.S. PATENT DOCUMENTS 3,286,305 A 11/1966 Seckel
3,809,514 A 5/1974 Nunez
(Continued)

FOREIGN PATENT DOCUMENTS

DE 4102257 A1 7/1992
EP 1832733 A3 9/2008
(Continued)

OTHER PUBLICATIONS

International Search Report dated Feb. 8, 2021 for PCT/US2020/060305 to Continuous Composites Inc. filed on Nov. 12, 2020.
(Continued)

*Primary Examiner* — Chun Cao
*Assistant Examiner* — Ameir Myers
(74) *Attorney, Agent, or Firm* — Ryan Stockett

(57) ABSTRACT

A method is disclosed for use in additively manufacturing a composite structure from reinforcements wetted with a matrix. The method may include slicing a virtual model of the composite structure into multiple slices that are adjacent to each other along a length direction of the composite structure and determining points of the reinforcements passing through each of the multiple slices. The method may further include clocking the points differently around each of the multiple slices and generating at least one tool path including a sequenced subset of the points. The method may additionally include causing an additive manufacturing machine to discharge the reinforcements along the at least one tool path.

15 Claims, 6 Drawing Sheets

(51) Int. Cl.
  *B33Y 40/20* (2020.01)
  *B33Y 50/02* (2015.01)
  *B33Y 10/00* (2015.01)

(52) U.S. Cl.
  CPC ........ *B33Y 50/02* (2014.12); *B29C 2793/009* (2013.01)

(56) References Cited

U.S. PATENT DOCUMENTS

| | | | |
|---|---|---|---|
| 3,984,271 | A | 10/1976 | Gilbu |
| 3,993,726 | A | 11/1976 | Moyer |
| 4,643,940 | A | 2/1987 | Shaw et al. |
| 4,671,761 | A | 6/1987 | Adrian et al. |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,124,797 | B2 | 10/2006 | Anderson et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 11,117,362 | B2 * | 9/2021 | van Tooren ........... B29C 64/165 |
| 11,148,409 | B2 * | 10/2021 | Mark .................... B29C 64/118 |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |
| 2008/0176092 | A1 | 7/2008 | Owens |
| 2009/0095410 | A1 | 4/2009 | Oldani |
| 2011/0032301 | A1 | 2/2011 | Fienup et al. |
| 2011/0143108 | A1 | 6/2011 | Fruth et al. |
| 2012/0060468 | A1 | 3/2012 | Dushku et al. |
| 2012/0159785 | A1 | 6/2012 | Pyles et al. |
| 2012/0231225 | A1 | 9/2012 | Mikulak et al. |
| 2012/0247655 | A1 | 10/2012 | Erb et al. |
| 2013/0164498 | A1 | 6/2013 | Langone et al. |
| 2013/0209600 | A1 | 8/2013 | Tow |
| 2013/0233471 | A1 | 9/2013 | Kappesser et al. |
| 2013/0292039 | A1 | 11/2013 | Peters et al. |
| 2013/0337256 | A1 | 12/2013 | Farmer et al. |
| 2013/0337265 | A1 | 12/2013 | Farmer |
| 2014/0034214 | A1 | 2/2014 | Boyer et al. |
| 2014/0061974 | A1 | 3/2014 | Tyler |
| 2014/0159284 | A1 | 6/2014 | Leavitt |
| 2014/0232035 | A1 | 8/2014 | Bheda |
| 2014/0268604 | A1 | 9/2014 | Wicker et al. |
| 2014/0291886 | A1 | 10/2014 | Mark et al. |
| 2015/0136455 | A1 | 5/2015 | Fleming |
| 2016/0012935 | A1 | 1/2016 | Rothfuss |
| 2016/0031155 | A1 | 2/2016 | Tyler |
| 2016/0046082 | A1 | 2/2016 | Fuerstenberg |
| 2016/0052208 | A1 | 2/2016 | Debora et al. |
| 2016/0082641 | A1 | 3/2016 | Bogucki et al. |
| 2016/0082659 | A1 | 3/2016 | Hickman et al. |
| 2016/0107379 | A1 | 4/2016 | Mark et al. |
| 2016/0114532 | A1 | 4/2016 | Schirtzinger et al. |
| 2016/0136885 | A1 | 5/2016 | Nielsen-Cole et al. |
| 2016/0144565 | A1 | 5/2016 | Mark et al. |
| 2016/0144566 | A1 | 5/2016 | Mark et al. |
| 2016/0192741 | A1 | 7/2016 | Mark |
| 2016/0200047 | A1 | 7/2016 | Mark et al. |
| 2016/0243762 | A1 | 8/2016 | Fleming et al. |
| 2016/0263806 | A1 | 9/2016 | Gardiner |
| 2016/0263822 | A1 | 9/2016 | Boyd |
| 2016/0263823 | A1 | 9/2016 | Espiau et al. |
| 2016/0271876 | A1 | 9/2016 | Lower |
| 2016/0297104 | A1 | 10/2016 | Guillemette et al. |
| 2016/0311165 | A1 | 10/2016 | Mark et al. |
| 2016/0325491 | A1 | 11/2016 | Sweeney et al. |
| 2016/0332369 | A1 | 11/2016 | Shah et al. |
| 2016/0339633 | A1 | 11/2016 | Stolyarov et al. |
| 2016/0346998 | A1 | 12/2016 | Mark et al. |
| 2016/0361869 | A1 | 12/2016 | Mark et al. |
| 2016/0368213 | A1 | 12/2016 | Mark |
| 2016/0368255 | A1 | 12/2016 | Witte et al. |
| 2017/0007359 | A1 | 1/2017 | Kopelman et al. |
| 2017/0007360 | A1 | 1/2017 | Kopelman et al. |
| 2017/0007361 | A1 | 1/2017 | Boronkay et al. |
| 2017/0007362 | A1 | 1/2017 | Chen et al. |
| 2017/0007363 | A1 | 1/2017 | Boronkay |
| 2017/0007365 | A1 | 1/2017 | Kopelman et al. |
| 2017/0007366 | A1 | 1/2017 | Kopelman et al. |
| 2017/0007367 | A1 | 1/2017 | Li et al. |
| 2017/0007368 | A1 | 1/2017 | Boronkay |
| 2017/0007386 | A1 | 1/2017 | Mason et al. |
| 2017/0008333 | A1 | 1/2017 | Mason et al. |
| 2017/0015059 | A1 | 1/2017 | Lewicki |
| 2017/0015060 | A1 | 1/2017 | Lewicki et al. |
| 2017/0021565 | A1 | 1/2017 | Deaville |
| 2017/0028434 | A1 | 2/2017 | Evans et al. |
| 2017/0028588 | A1 | 2/2017 | Evans et al. |
| 2017/0028617 | A1 | 2/2017 | Evans et al. |
| 2017/0028619 | A1 | 2/2017 | Evans et al. |
| 2017/0028620 | A1 | 2/2017 | Evans et al. |
| 2017/0028621 | A1 | 2/2017 | Evans et al. |
| 2017/0028623 | A1 | 2/2017 | Evans et al. |
| 2017/0028624 | A1 | 2/2017 | Evans et al. |
| 2017/0028625 | A1 | 2/2017 | Evans et al. |
| 2017/0028627 | A1 | 2/2017 | Evans et al. |
| 2017/0028628 | A1 | 2/2017 | Evans et al. |
| 2017/0028633 | A1 | 2/2017 | Evans et al. |
| 2017/0028634 | A1 | 2/2017 | Evans et al. |
| 2017/0028635 | A1 | 2/2017 | Evans et al. |
| 2017/0028636 | A1 | 2/2017 | Evans et al. |
| 2017/0028637 | A1 | 2/2017 | Evans et al. |
| 2017/0028638 | A1 | 2/2017 | Evans et al. |
| 2017/0028639 | A1 | 2/2017 | Evans et al. |
| 2017/0028644 | A1 | 2/2017 | Evans et al. |
| 2017/0030207 | A1 | 2/2017 | Kittleson |

(56) References Cited

U.S. PATENT DOCUMENTS

| | | |
|---|---|---|
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065308 A1* | 3/2018 | Stockett ................. B33Y 50/00 |
| 2019/0009472 A1* | 1/2019 | Mark ..................... B33Y 10/00 |
| 2020/0156323 A1* | 5/2020 | Woytowitz .............. G06T 17/20 |
| 2020/0307174 A1* | 10/2020 | Woytowitz ............ B29C 64/393 |
| 2020/0331195 A1* | 10/2020 | Rumbak ............... B29C 64/209 |
| 2021/0252596 A1* | 8/2021 | Sale ....................... B33Y 10/00 |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |
| WO | 2019030462 A1 | 2/2019 |

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995). cited by applicant .

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

* cited by examiner

SYSTEM AND METHOD FOR ADDITIVE MANUFACTURING

RELATED APPLICATIONS

This application claims the benefit of priority from U.S. Provisional Application No. 62/955,352 filed on Dec. 30, 2019, the contents of which are expressly incorporated herein by reference.

TECHNICAL FIELD

The present disclosure relates generally to a manufacturing system and, more particularly, to a system for additively manufacturing composite structures and a method of operating the system.

BACKGROUND

Filament winding (FW) is a known method of fabricating vessels. FW involves the winding of resin-coated filaments around a rotating mandrel. The mandrel rotates at a constant rate, while an associated filament dispenser moves axially along a length of the mandrel also at a constant rate. These combined movements allow the filament to be wrapped around the mandrel at a specified angle (i.e., at an angle corresponding to the relative rotational and translational rates of motion) relative to an axis of the mandrel. Once a desired pattern of overlapping filaments has been laid onto the mandrel, the mandrel is placed into an autoclave and heated to cure the resin. Thereafter, the mandrel can be extracted from inside of the filaments to leave a hollow vessel in its place. Vessels fabricated via FW may be inexpensive because of how little manual labor is required by the process.

Although FW may be an efficient way to fabricate vessels, these vessels may be design-limited and/or require excessive amounts of raw materials. For example, Applicant has found that FW may be capable of closely aligning adjacent filaments on a surface of the mandrel only when the mandrel has a relatively constant perimeter along its length. When the perimeter varies along its length, gaps may be created between adjacent filaments. These gaps can weaken the resulting vessel and/or require additional layers of material to provide equivalent strength. Additional materials can increase a cost and weight of the vessel.

The disclosed system and method are directed to overcoming one or more of the problems set forth above and/or other problems of the prior art.

SUMMARY

In one aspect, the present disclosure is directed to a method of additively manufacturing a composite structure from reinforcements wetted with a matrix. The method may include slicing a virtual model of the composite structure into multiple slices that are adjacent to each along a length direction of the composite structure and determining points of the reinforcements passing through each of the multiple slices. The method may further include clocking the points differently around each of the multiple slices and generating at least one tool path including a sequenced subset of the points. The method may additionally include causing an additive manufacturing machine to discharge the reinforcements along the at least one tool path.

In yet another aspect, the present disclosure is directed to another method of additively manufacturing a composite structure from reinforcements wetted with a matrix. This method may include receiving a virtual model of the composite structure. The virtual model may have a required section and a sacrificial section. The method may further include slicing the virtual model into multiple slices that are adjacent to each other along a length direction of the composite structure, selectively adjusting geometry of the sacrificial section to reduce perimeter variability between the multiple slices, and determining points of the reinforcements passing through each of the multiple slices. The method may additionally include generating at least one tool path including a sequenced subset of the points and causing an additive manufacturing machine to discharge the reinforcements along the at least one tool path. The method may also include cutting away the sacrificial section.

DETAILED DESCRIPTION

Figure 1:
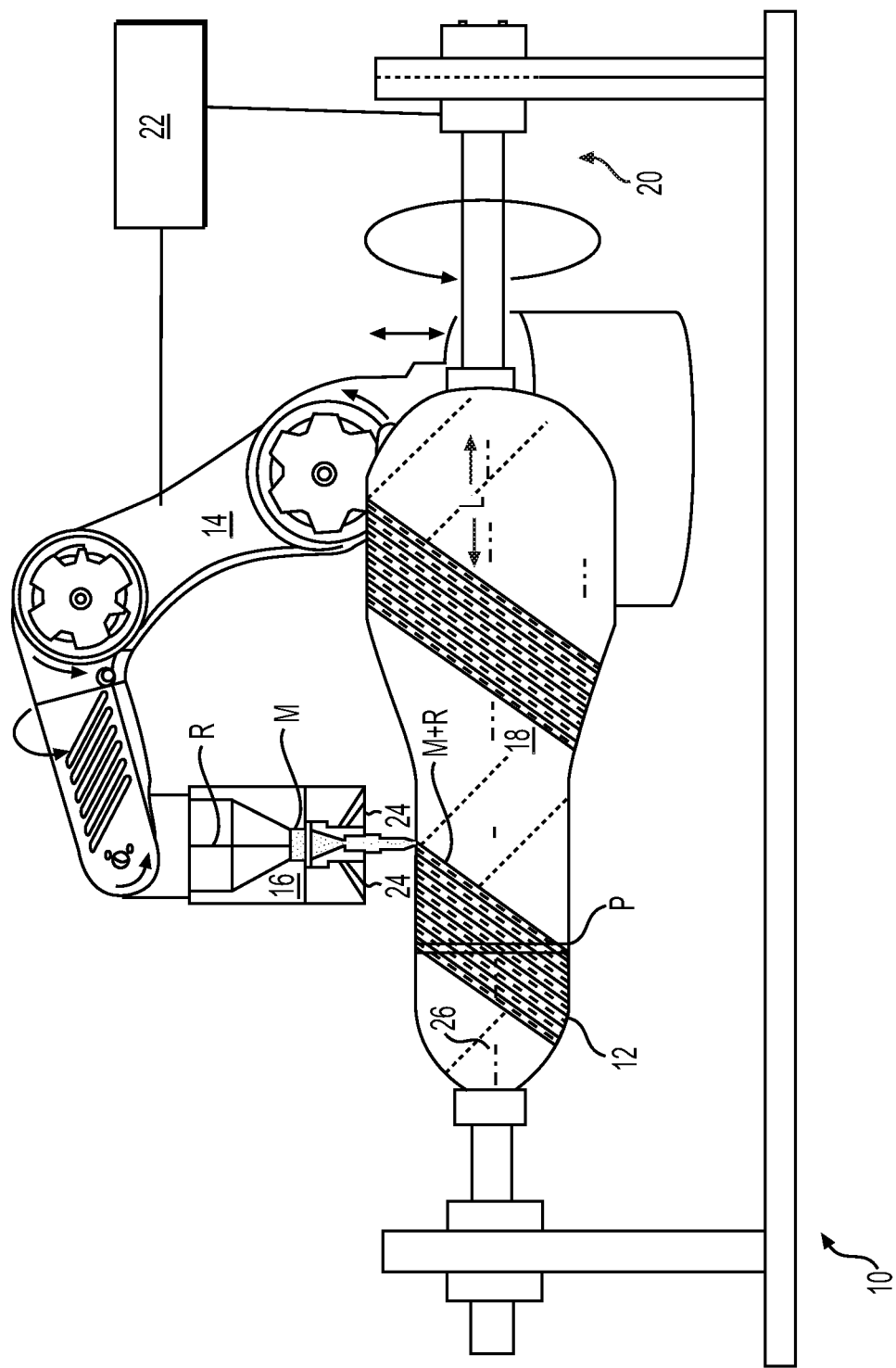
FIG. 1 is an isometric illustration of an exemplary disclosed additive manufacturing system.

FIG. 1 illustrates an exemplary system 10, which may be used to manufacture a structure 12 having any desired shape. System 10 may include, among other things, a support 14, at least one deposition head ("head") 16, a mandrel 18, and drive 20. Head 16 may be coupled to and moved by support 14 during discharge of material onto mandrel 18. In the disclosed embodiment of FIG. 1, support 14 is a robotic arm capable of moving head 16 in multiple directions during material discharge. Support 14 may alternatively embody a gantry or a hybrid gantry/arm capable of moving head 16 in any number of directions during fabrication of structure 12. Mandrel 18 may function as an internal mold for an outer shell of structure 12 and may form a temporary or permanent part thereof. Drive 20, in its simplest form, may embody a motor (e.g., an electric motor, a hydraulic motor, a pneumatic motor, etc.) that is powered to rotate mandrel 18 during shell formation of structure 12. Operations of support 14, head 16, and drive 20 may be regulated in a coordinated manner by a controller 22.

Structure 12, as will be described in more detail below, may be fabricated by system 10 from a continuous reinforcement (R) that is at least partially coated with a matrix (M). For the purposes of this disclosure, the matrix-coated continuous reinforcement may be considered a composite material. Structure 12 may consist of an outer shell of the composite material laid over a solid interior (e.g., when mandrel 18 forms a permanent part of structure 12 and is solid), a non-solid infill (e.g., when mandrel 18 forms a permanent part of structure 12 and is less than 100% solid), or a hollow interior (e.g., when mandrel 18 is not a permanent part of structure 12 and removed during and/or after fabrication structure 12 is completed), as desired. The interior of structure 12, when solid or partially-solid, may be of the same composite material as the outer shell or a different material, as desired.

The matrix may include any material (e.g., a liquid resin, such as a zero-volatile organic compound resin; a powdered metal; etc.) that is curable. Exemplary resins include thermosets, single- or multi-part epoxy resins, polyester resins, cationic epoxies, acrylated epoxies, urethanes, esters, thermoplastics, photopolymers, polyepoxides, thiols, alkenes, thiol-enes, and more.

The continuous reinforcement may have the form of individual fibers, tows, rovings, wires, tubes, socks, and/or sheets that are made from, for example, carbon, glass, vegetable matter, wood, minerals, metal, plastic (e.g., UHMWPE), etc. It should be noted that the term "reinforcement" is meant to encompass both structural and non-structural types (e.g., functional types) of continuous materials that are at least partially wetted with the matrix discharging from head 16.

The reinforcements may be exposed to (e.g., at least partially wetted with) the matrix while the reinforcements are inside head 16, while the reinforcements are being passed to head 16, and/or while the reinforcements are discharging from head 16. The matrix, dry (e.g., unimpregnated) reinforcements, and/or pre-impregnated reinforcements (e.g., reinforcements that are already exposed to matrix) may be transported into head 16 in any manner apparent to one skilled in the art. In some embodiments, a filler material (e.g., chopped fibers) may be mixed with the matrix before and/or after the matrix coats the continuous reinforcements.

One or more cure enhancers (e.g., a light source, a radiation source, an ultrasonic emitter, a microwave generator, a magnetic field generator, a laser, a heater, a catalyst dispenser, etc.) 24 may be mounted proximate (e.g., within, on, and/or adjacent) head 16 and configured to affect (e.g., initiate, enhance, complete, or otherwise facilitate) curing of the matrix as it is discharged from head 16. Cure enhancer 24 may be controlled to selectively expose portions of structure 12 to energy (e.g., electromagnetic radiation, vibrations, heat, a chemical catalyst, etc.) during material discharge and the formation of structure 12. The energy may trigger a reaction to occur within the matrix, increase a rate of the reaction, sinter the matrix, pyrolyze the matrix, harden the matrix, stiffen the material, or otherwise cause the matrix to partially or fully cure as it discharges from head 16. The amount of energy produced by cure enhancer 24 may be sufficient to at least partially cure the matrix before structure 12 axially grows more than a predetermined length away from head 16. In one embodiment, structure 12 is cured sufficient to hold its shape before the axial growth length becomes equal to an external diameter of the matrix-coated reinforcement.

The continuous reinforcement may be pulled from head 16 via relative motion between head 16 and mandrel 18 imparted by support 14 and/or drive 20. The matrix may cling to the reinforcement and thereby also be pulled from head 16 along with the reinforcement. The pulling motion may induce tension within the reinforcement, and the tension may increase a strength of structure 12 (e.g., by aligning the reinforcements, inhibiting buckling, etc.). It should be noted that the movement of reinforcement through head 16 could be assisted via internal feed mechanisms, if desired. However, the discharge rate of reinforcement from head 16 may primarily be the result of relative movement between head 16 and mandrel 18.

Figure 2:
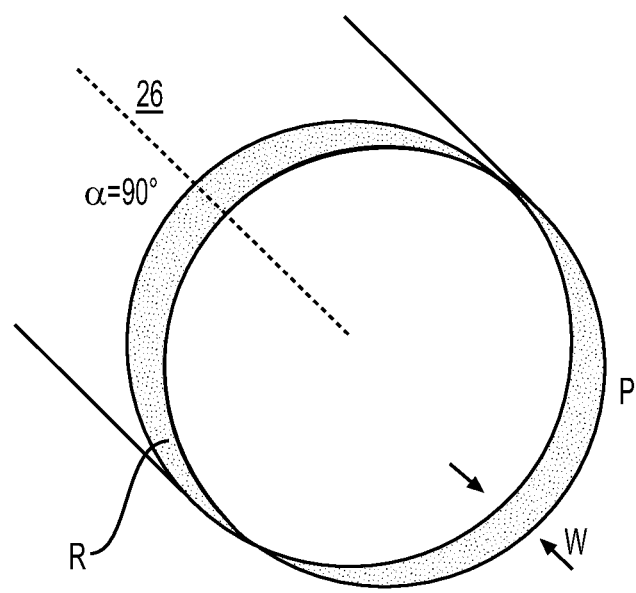
FIGS. 2, 3, 4, 5, and 6 are isometric illustrations of exemplary portions of a structure that may be manufactured by the additive manufacturing system of FIG. 1.
Figure 3:
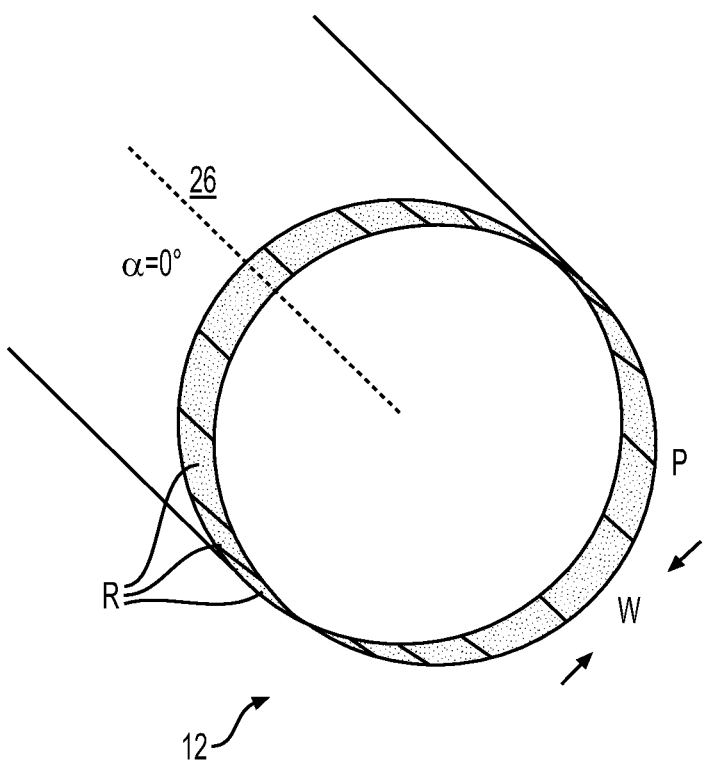

As can be seen in FIG. 1, structure 12 may have a length direction (L) that generally coincides with an axis 26 of mandrel 18, and a perimeter (P) that varies along the length direction (L). As can be seen in FIGS. 2 and 3, a number of reinforcements (R) that passes through the perimeter (P) at a given location along the length direction (L) may be at least partially dependent on a width (W) of each reinforcement (R) and an angle ($\alpha$) of the reinforcement (R) (e.g., the angle of a central axis or edge of the reinforcement (R) relative to axis 26). In the embodiment of FIG. 2, the angle ($\alpha$) of the reinforcement (R) relative to axis 26 is about (e.g., within engineering tolerances) 90° and only a single reinforcement (R) passes through the perimeter (P). In the embodiment of FIG. 3, the angle ($\alpha$) of the reinforcement (R) relative to axis 26 is about (e.g., within engineering tolerances) 0° and a maximum number (i.e., a greatest number without causing overlap) of reinforcements (R) passes through the perimeter (P). The angle ($\alpha$) of the reinforcements (R) within structure 12 may be selectively varied between 0° and ±90° to adjust the number of reinforcements (R) passing through the perimeter (P) at a particular location of structure 12 along the length direction (L). Likewise, the number of reinforcements (R) within structure 12 that passes through the perimeter (P) at a given location along the length direction (L) may be selectively varied between one and the maximum number to adjust the angle of the reinforcements (R) relative to axis 26.

Figure 4:
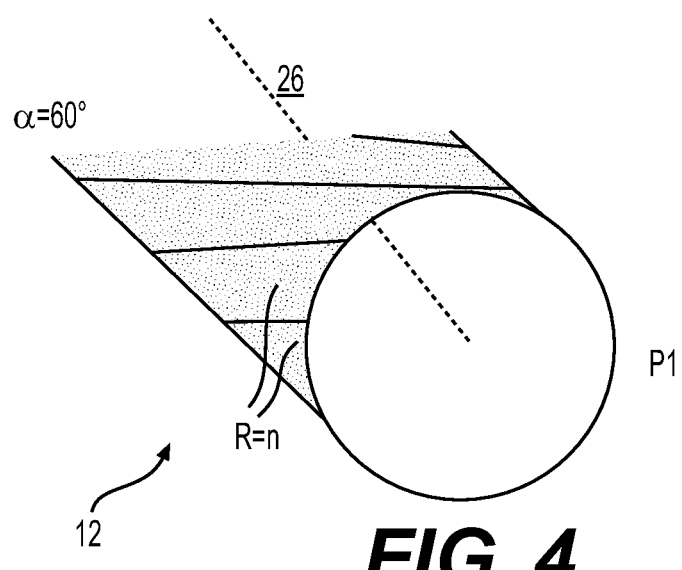
Figure 5:
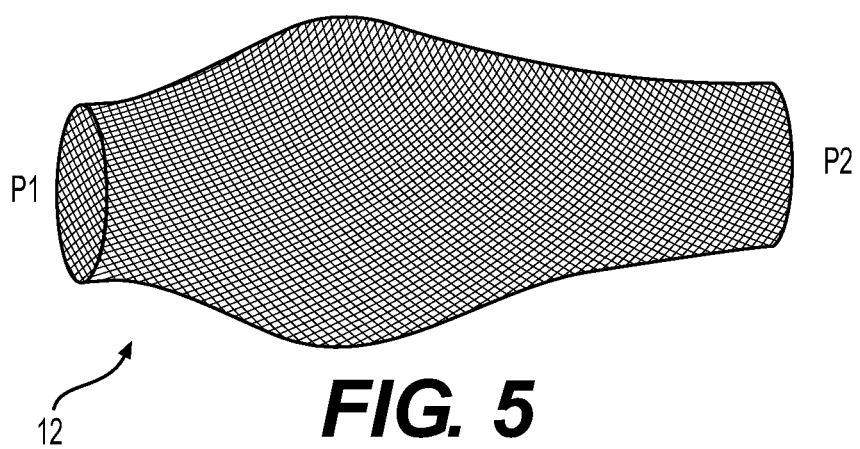
Figure 6:
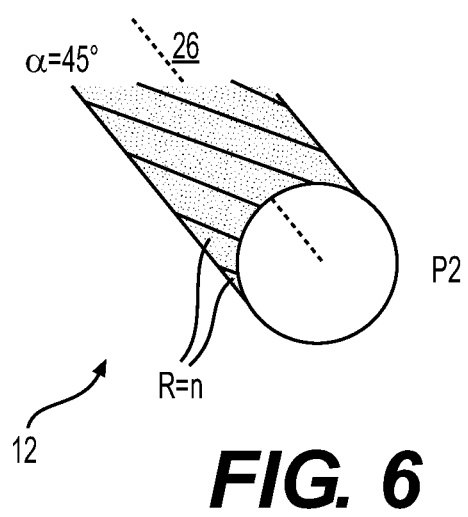

As shown in FIGS. 4, 5, and 6, in order for the reinforcements (R) to be discharged adjacent each other (i.e., without gaps, without overlaps, and without adding or dropping reinforcements (R) during fabrication of structure 12) on mandrel 18 (referring to FIG. 1), the angle ($\alpha$) of the reinforcements (R) passing through different sized perimeters (P) along the length (L) of structure 12 may need to vary. For example, in order to maintain a same number of reinforcements (R) passing through a larger perimeter (P1) that passes through a smaller perimeter (P2) without creating gaps, the reinforcements (R) at perimeter (P1) must be shifted to a greater angle ($\alpha$—for example from 45° to 60°) in order to consume the entire perimeter (P1). Expressed differently, in order to maintain the same number of reinforcements (R) passing through the smaller perimeter (P2) that passes through the larger perimeter (P1) without creating overlaps, the reinforcements (R) at perimeter (P2) must be shifted to a smaller angle ($\alpha$—for example from 60° to 45°).

Controller 22 (referring to FIG. 1) may be programmed to regulate operations of support 14, head 16, and/or drive 20 to selectively vary the angle ($\alpha$) of the reinforcements (R) passing through the perimeter (P) of structure 12 at any location along the length direction (L). Controller 22 may embody or otherwise include a single processor or multiple general or special processors that are configured to control an operation of system 10. Controller 22 may further include or be associated with a memory for storing data such as, for example, design limits, performance characteristics, operational instructions, tool paths, and corresponding parameters of each component of system 10. Various other known circuits may be associated with controller 22, including power supply circuitry, signal-conditioning circuitry, solenoid driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of lookup tables, graphs, and/or equations. In the disclosed embodiment, the maps may be used by controller 22 to determine the movements of head 16 and/or mandrel 18 required to produce desired geometry (e.g., size, shape, material composition and geometry, performance parameters, contour, etc.) of structure 12 and to regulate operation of cure enhancer(s) 24 and/or other related components in coordination with the movements.

Figure 7:
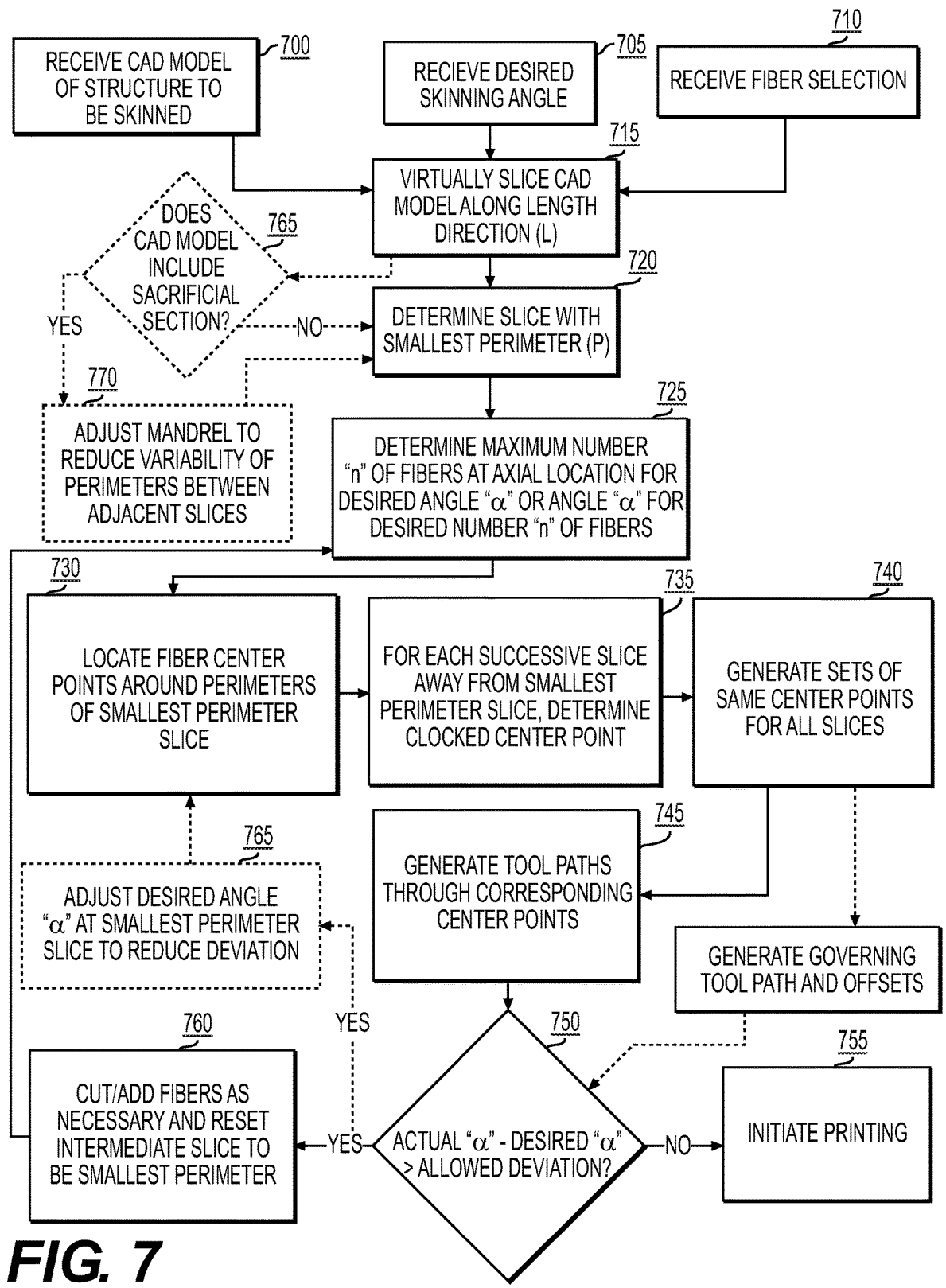
FIG. 7 is a flowchart depicting exemplary methods that may be performed by the additive manufacturing system of FIG. 1 during fabrication of the structure of FIGS. 2-6.
Figure 8:
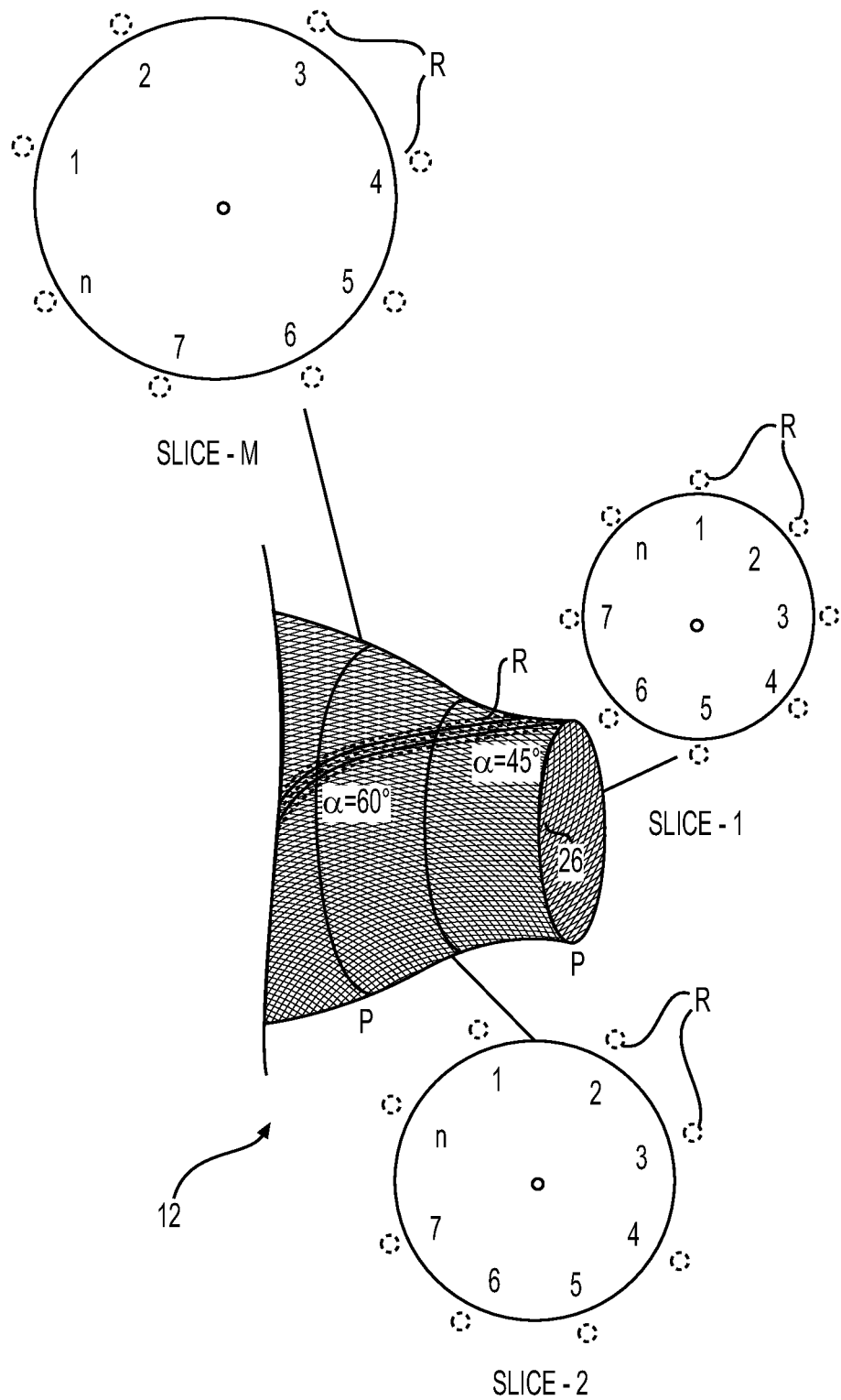
FIGS. 8 and 9 are diagrammatic illustrations of the methods disclosed in the flowchart of FIG. 7.
Figure 9:
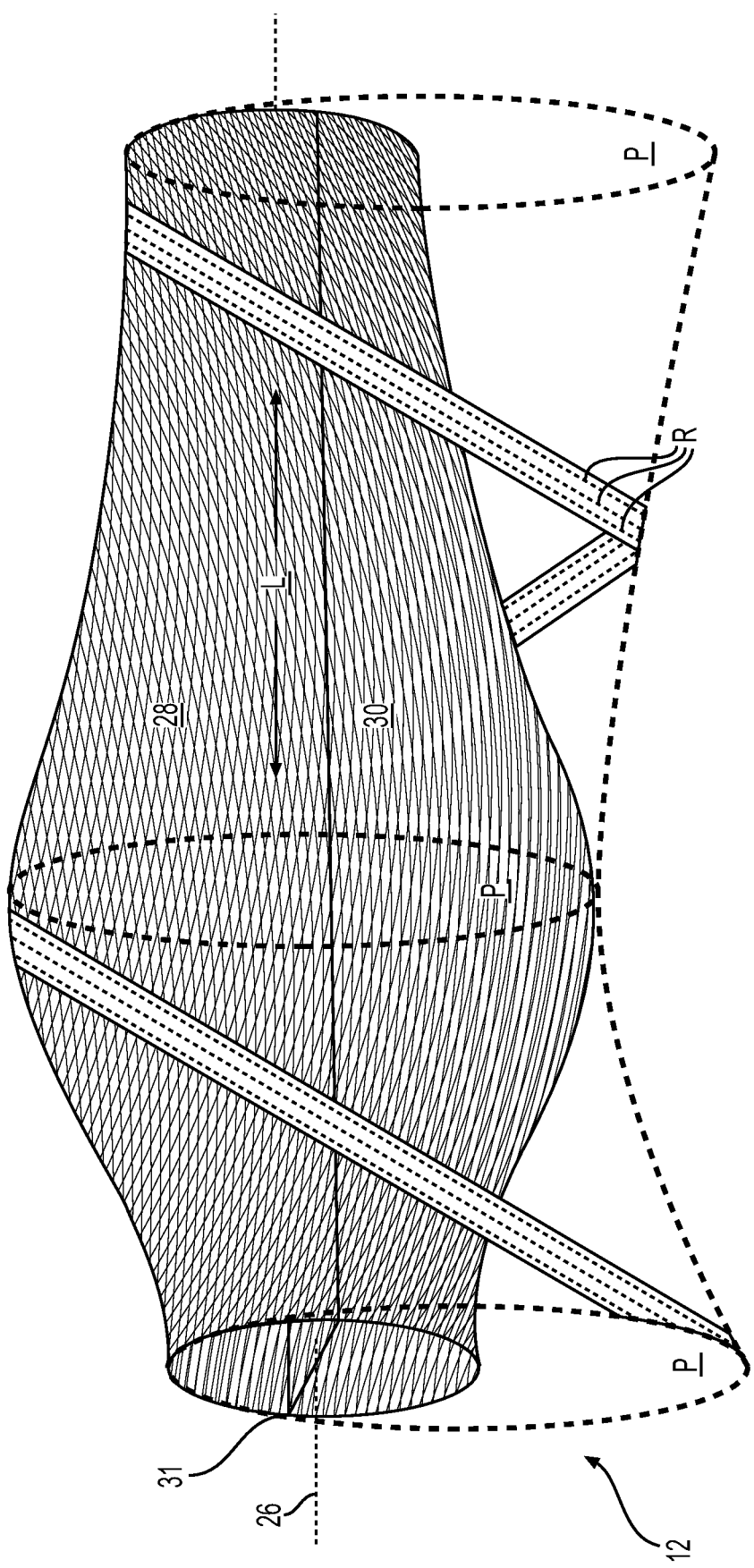

FIGS. 7, 8 and 9 illustrate exemplary methods that may be performed by controller 22 during the fabrication of structure 12. These figures will be discussed in more detail in the following section to further illustrate the disclosed concepts.

INDUSTRIAL APPLICABILITY

The disclosed system may be used to manufacture composite structures having any desired cross-sectional shape, perimeter, and length. The composite structures may include any number of different continuous fibers of the same or different types and of the same or different diameters, and any number of different matrixes of the same or different makeup. Operation of system 10 will now be described in detail.

As illustrated in the flowchart of FIG. 7, at a start of a manufacturing event, information regarding a desired structure 12 to be fabricated may be received into system 10 (e.g., into controller 22 that is responsible for regulating operations of support 14, heads 16, and drive 20). This may include receiving, among other things, a virtual model of structure 12 (e.g., of mandrel 18 that is to be overlaid with a particular schedule of matrix-coated reinforcements—Step 700), a desired angle of the reinforcements relative to axis 26 at one or more locations along the length (L) of structure 12 (Step 705), and a selection of the particular reinforcement (e.g., material, width, thickness, etc.) that is to be used (Step 710). It is contemplated that, instead of the desired angle received from the user at Step 705, the user could alternatively select a particular number of reinforcements (R) that passes through the perimeter of structure 12 at any given axial location of structure 12.

After completion of at least Step 700, controller 22 may be configured to virtually slice the CAD model of structure 12 along the length direction (L) (Step 715). The slicing may be performed at only critical locations (e.g., locations of geometry change), performed at regularly spaced default intervals, and/or at intervals and/or locations specified by a user. In one embodiment, the resulting slices may be oriented generally orthogonal to axis 26 (e.g., as shown in FIG. 8). In another embodiment, the slices may be oriented to generally align with the angle ($\alpha$) of the reinforcements (R). In this embodiment, although shown as concentric circles, the shapes of the slices may not need to be the same, concentric, or even similar. Regardless of the method used to generate the slices, controller 22 may then determine which of the slices has a smallest perimeter (P) (Step 720).

Depending on the input received at Steps 700-710, controller 22 may either select the number of reinforcements (R) to cross through the smallest perimeter (P) given a particular angle ($\alpha$) requested by the user or select the angle ($\alpha$) for the particular number of reinforcements (R) that the user requested pass through the smallest-perimeter slice (Step 725). In either of these scenarios, the smallest-perimeter slice (e.g., Slice-1 shown in FIG. 8) may be used as a starting point for laying out a trajectory of all of the reinforcements (R) within the rest of the virtual model of structure 12. It should be noted that, although shown in FIG. 8 as an end-perimeter, the smallest-perimeter slice could just as easily be located between ends of structure 12.

In one example, controller 22 may determine that, for a user-requested angle of ($\alpha$) at the smallest-perimeter slice, the maximum number of reinforcements having the geometry input by the user that fits around the smallest-perimeter slice is "n." This determination may be made using EQ-1 below.

$$n = P/(W/\sin \alpha), \text{ wherein:} \qquad \text{EQ-1}$$

n is the maximum number of reinforcements that passes through the smallest perimeter (P);

W is a dimension (e.g., width or diameter) of the reinforcement; and $\alpha$ is the angle of the reinforcement relative to axis 26.

In another example, controller 22 may determine that, for a number "n" of reinforcements requested by the user to pass through the smallest perimeter, the angle that causes the reinforcements to be located adjacent each other (i.e., without gapping or overlapping) or located with a desired amount of equal gapping or overlapping therebetween should be ($\alpha$). This determination may be made using EQ-2 below.

$$\alpha = \sin^{-1}(n \cdot W/P), \text{ wherein:} \qquad \text{EQ-2}$$

n is the number of reinforcements that passes through the smallest perimeter;

W is the dimension of the reinforcement; and $\alpha$ is the angle of the reinforcement relative to axis 26.

Based on only the number "n" of the reinforcements, controller 22 may determine a three-dimensional center point of each reinforcement (i.e., from reinforcement-1 to reinforcement-n) around each of the slices, starting with the smallest-perimeter slice (See Slice-1 of FIG. 8) (Step 730). The center points may be equally distributed around the perimeter of each slice, located at an outer surface of structure 12, and clocked in a direction corresponding to the angle ($\alpha$) and an axial location relative to an adjacent perimeter slice (Step 730). The amount of clocking may correspond with a ratio of the perimeter of a given slice to the smallest perimeter. See, for example, the center points 1-n in each of slices 1-m in FIG. 8. In this example, center points 1-n may start with $\text{Point}_1$ located at 12:00 in $\text{Slice}_1$, and each of the remaining points 2-n angularly distributed apart from each other by °360/n. In $\text{Slice}_2$, $\text{Point}_1$ is shifted counterclockwise from its starting position at 12:00 to a new angle around the perimeter P2 that is a function of the angle ($\alpha$) at P1, a ratio of perimeters P1/P2, and an axial distance from P1 to P2. This shifting may be made using EQ-3 below.

$$\text{Point}_n\text{Slice}_m = \text{Point}_n\text{Slice}_{m-1} + f(\alpha_{Pm-1}, Pm/P\text{smallest}, L_{Pm \text{ to } Pm-1}), \text{ wherein:} \qquad \text{EQ-3}$$

$\text{Point}_n\text{Slice}_m$ is the clocked position of a point n within a given slice m;

$\text{Point}_n\text{Slice}_{m-1}$ is the clocked position of the same point n within an adjacent slice m−1;

$\alpha_{Pm-1}$ is the angle $\alpha$ of the reinforcement at the adjacent slice m−1;

Pm/Psmallest is a ratio of the perimeters of the given slice Pm relative to the smallest perimeter; and $L_{Pm \text{ to } Pm-1}$ is the axial distance along structure 12 between the given slice Pm and the adjacent slice Pm−1.

Controller 22 may then generate subsets of center points that correspond to a common reinforcement (Step 735). For example, controller 22 may generate a first subset that includes all center points labeled 1 (e.g., $\text{Point}_1\text{Slice}_2$, $\text{Point}_1\text{Slice}_2$, ..., $\text{Point}_1\text{Slice}_m$), a second subset that includes all center points labeled 2 (e.g., $\text{Point}_2\text{Slice}_1$, $\text{Point}_2\text{Slice}_2$, ..., $\text{Point}_2\text{Slice}_m$), and so forth (e.g., $\text{Point}_n\text{Slice}_1$, $\text{Point}_n\text{Slice}2$, ..., $\text{Point}_n\text{Slice}_m$) until the subset including all center points labeled n have been generated. The center points may be sequenced within each subset, starting from a slice at a first end of structure 12 (e.g., at $Slice_1$), passing through the smallest perimeter slice, and ending with a slice (e.g., at $Slice_m$) at an opposing end of structure 12.

Controller 22 may then generate one or more tool paths that correspond to the subsets of center points generated at Step 735 (Step 745). In one example, a governing tool path may be generated (Step 747) that corresponds to the first subset of center points (Step 740), and additional tool paths (e.g., tool paths in number equal to the number of sets of center points) may then be generated simply as offsets from the governing tool path. In this example, the offset dimension may be equal to the dimension of the reinforcement that is to be placed along each tool path. In another example, separate tool paths are independently generated for each subset of center points, without any one subset being designated as the governing tool path or offset tool paths.

An exemplary tool path (e.g., the governing tool path) may include a sequenced subset of center points, which an outlet (e.g., a tool center point—TCP) of head 16 should pass through, an attitude or posture that head 16 should achieve at each center point in the subset, and an orientation of head 16 at each center point. In majority of circumstances, a central axis of head 16 should be generally (e.g., within engineering tolerances) normal to the outer surface of mandrel 18 at each center point, and oriented to have a forward travel direction generally aligned with a vector passing linearly from a current center point to a next center point in the subset. The normal for each center point can be calculated by crossing the forward travel direction vector with a perimeter vector at the center point that lies in the same plane as the forward travel direction vector.

As shown in FIG. 8, dramatic changes in perimeter between adjacent slices may result in similar dramatic changes in the angle ($\alpha$) within the tool path between adjacent slices. Significant deviation from a user-input angle ($\alpha$) may not be allowed in some applications. Accordingly, controller 22 may be configured to make a comparison of a difference between an actual and a desired ($\alpha$) with an allowed deviation (Step 750). The allowed deviation may be input by the user, determined by controller 22 based on a size, geometry, application, etc. of structure 12, and/or a standard deviation provided by industry. When the comparison indicates that the difference determined at Step 750 is less than the allowed deviation (Step 750: No), controller 22 may direct commands to support 14, head 16, and/or drive 20 corresponding to the tool path determined at Step 745 to initiate printing by system 10 (Step 755).

However, if at Step 750 controller 22 determines that the difference is greater than the allowed deviation (Step 750: Yes), controller 22 may be programmed to selectively make adjustments to the tool path. For example, controller 22 may insert one or more additional tool paths starting at an intermediate slice and/or cut away portions of existing tool path(s), and designate the intermediate slice as the smallest perimeter (Step 760). Control may then return to Step 725.

Alternatively, instead of relying on the tool path to have exactly the user-desired angle ($\alpha$) at the smallest perimeter slice, it may be acceptable to allow the desired angle ($\alpha$) to deviate somewhat at the smallest perimeter slice if such deviation brings deviations at other slices within structure 12 back within the allowed deviation range. For example, if the desired angle ($\alpha$) for the smallest perimeter slice was selected by the user to be 45° and if a greatest allowed deviation was selected or automatically set to be ±10°, an angle ($\alpha$) resulting at a largest perimeter slice of 60° after completion of Step 745 would exceed the greatest allowed deviation (Step 750: Yes). However, if at the smallest perimeter slice, the angle ($\alpha$) was allowed to deviate ±5° (e.g. to 40°) from the user-desired angle (e.g., instead of being set at exactly 45°), the angle ($\alpha$) at the largest perimeter slice might turn out to be only 55°, which is within the allowed deviation range. Accordingly, when controller 22 determines at Step 750 that the allowed deviation at any slice other than the smallest-perimeter slice has been exceeded (Step 750: Yes), controller 22 may adjust the desired angle ($\alpha$) for the smallest perimeter slice to a value that reduces deviation of the angle ($\alpha$) at the remaining slice(s) (Step 765). Control may then return to Step 730.

In some applications, varying the angle ($\alpha$) of the reinforcements (R) within a particular layer of structure 12 may not be allowed at all (e.g., the deviation threshold may be very small) In these same applications, it may also be possible to discard a portion of structure 12 after fabrication. For example, FIG. 9 illustrates structure 12 as having a required section 28 and a sacrificial section 30 that may be cut away from required section 28 after fabrication and discarded. Sacrificial section 30 may be utilized to allow winding of structure 12 via the disclosed method(s) and system and/or to temporarily stiffen or otherwise provide a desired characteristic during fabrication. Normally, sacrificial section 30 may mirror or substantially balance required section 28 relative to a plane 32 passing through axis 26. However, it has been found that, if sacrificial section 30 is instead adjusted (increased and/or decreased in perimeter) to provide about (e.g., within engineering tolerances) the same perimeter (P) at every given location along the length (L), the reinforcements (R) may maintain about (e.g., within engineering tolerances) the same angle ($\alpha$) in order to preserve desired spacing (i.e., to avoid gapping and/or overlapping of adjacent reinforcements (R)).

Accordingly, returning to Step 715 of FIG. 7, controller 22 may thereafter determine if the virtual model of structure 12 includes sacrificial section 30 (Step 765). If the virtual model does not include sacrificial section 30 (Step 765: No), control may proceed as outlined above, from Step 715 to Step 720. However, when controller 22 determines that sacrificial section 30 is included within the virtual model (Step 765: Yes), controller 22 may adjust a shape of structure 12 contained within the virtual model (Step 770). For example, the geometry of sacrificial section 30 may be selectively increased in perimeter at particular axial locations (e.g., at normally smaller perimeters—shown in FIG. 9) and/or selectively decreased in perimeter at other axial locations (e.g., at normally larger perimeters) to provide for a smaller deviation of perimeters (e.g., in some embodiments about equal perimeters, within engineering tolerances) at adjacent axial locations along the length (L). Control may proceed from Step 770 to Step 720.

The disclosed system may provide a way to fabricate an outer shell of (i.e., to skin) structure 12 while avoiding gaps between or overlapping of reinforcements. This may improve a strength of structure 12 and/or reduce a number of outer layers of reinforcements required to achieve a desired property. Fewer resources (e.g., time, materials, labor, etc.) may be required to fabricate structure 12, resulting in a lower cost.

It will be apparent to those skilled in the art that various modifications and variations can be made to the disclosed system and methods. Other embodiments will be apparent to those skilled in the art from consideration of the specification and practice of the disclosed system method. It is intended that the specification and examples be considered as exemplary only, with a true scope being indicated by the following claims and their equivalents.

What is claimed is:

1. A method of additively manufacturing a composite structure from reinforcements wetted with a matrix, the method comprising:
    slicing a virtual model of the composite structure into multiple slices that are adjacent to each other along a length direction of the composite structure;
    determining points of the reinforcements passing through each of the multiple slices;
    clocking the points differently around each of the multiple slices;
    generating at least one tool path including a sequenced subset of the points;
    causing an additive manufacturing machine to discharge the reinforcements along the at least one tool path around a mandrel; and
    further including:
        receiving input indicative of at least one of a desired number of the reinforcements and an angle of the reinforcements that should pass through a smallest perimeter slice of the multiple slices, wherein clocking the points includes clocking the points based on the input; and
        when receiving input indicative of at least one of a desired number of reinforcements and the angle of the reinforcements at the smallest perimeter slice of the virtual model includes receiving input indicative of the desired number of reinforcements, the method further includes determining the angle of the reinforcements based on a known dimension of the reinforcements and a perimeter of the smallest perimeter slice; and
        when receiving input indicative of at least one of a desired number of reinforcements and an angle of the reinforcements at a smallest perimeter slice of the virtual model includes receiving input indicative of the angle of the reinforcements, the method further includes determining the desired number of the reinforcements based on the known dimension of the reinforcements and the perimeter of the smallest perimeter slice.

2. The method of claim 1, further including selectively adjusting geometry of a sacrificial section of the virtual model to reduce perimeter variability between the multiple slices.

3. The method of claim 1, further including:
    determining a deviation of the at least one tool path from the angle at each of the points in the sequenced subset; and
    selectively adjusting the angle at the smallest perimeter slice when a maximum deviation of at the least one tool path passing through another of the multiple slices exceeds an allowed deviation.

4. The method of claim 1, further including:
    determining a deviation of the at least one tool path from the angle at each of the points in the sequenced subset; and
    selectively generating at least one of a reinforcement cut command and a reinforcement add command based on the deviation.

5. The method of claim 1, wherein generating the at least one tool path includes maintaining a same number of reinforcements passing through each of the multiple slices of the virtual model.

6. The method of claim 1, wherein generating the at least one tool path includes increasing the angle as perimeters of the multiple slices increase.

7. The method of claim 1, wherein generating the at least one tool path includes generating a plurality of tool paths, each corresponding to a different sequenced subset of the points.

8. The method of claim 1, wherein generating the at least one tool path includes:
    generating a governing tool path; and
    generating at least one additional tool path as an offset of the governing tool path.

9. The method of claim 8, wherein the offset is equal to a dimension of the reinforcements.

10. The method of claim 1, wherein the at least one tool path further includes:
    a normal vector indicative of a print head attitude that should be maintained by the additive manufacturing machine as it passes through each of the points in the sequenced subset; and
    a forward travel direction vector indicative of a print head orientation that should be maintained by the additive manufacturing machine as it passes through each of the points.

11. The method of claim 1, wherein slicing the virtual model includes slicing the virtual model into multiple slices that are each perpendicular to the length direction.

12. The method of claim 1, further wherein the mandrel is a rotating mandrel.

13. The method of claim 12, wherein the reinforcements form a shell of the composite structure.

14. The method of claim 1, wherein clocking the points includes clocking the points based on a perpendicular distance between the multiple slices.

15. A method of additively manufacturing a composite structure from reinforcements wetted with a matrix, the method comprising:
    slicing a virtual model of the composite structure into multiple slices that are adjacent to each other along a length direction of the composite structure;
    determining points of the reinforcements passing through each of the multiple slices;
    clocking the points differently around each of the multiple slices;
    generating at least one tool path including a sequenced subset of the points;
    causing an additive manufacturing machine to discharge the reinforcements along the at least one tool path around a mandrel; and
    further including:
        receiving input indicative of at least one of a desired number of the reinforcements and an angle of the reinforcements that should pass through a smallest perimeter slice of the multiple slices, wherein clocking the points includes clocking the points based on the input;
        wherein clocking the points includes clocking the points based on a perimeter ratio of each of the multiple slices to the smallest perimeter slice;
        wherein clocking the points includes clocking the points based further on a perpendicular distance between the multiple slices; and
        wherein clocking the points includes clocking the points based further on angles of the reinforcements passing through the smallest perimeter slice.

* * * * *